United States Patent
Orlando et al.

(10) Patent No.: US 11,340,798 B2
(45) Date of Patent: May 24, 2022

(54) MODIFICATION OF A MEMORY OF A SECURE MICROPROCESSOR

(71) Applicants: STMicroelectronics (Rousset) SAS, Rousset (FR); STMicroelectronics (Grand Ouest) SAS, Le Mans (FR)

(72) Inventors: William Orlando, Peynier (FR); Julien Couvrand, Le Mans (FR); Pierre Guillemin, Marseilles (FR)

(73) Assignees: STMICROELECTRONICS (GRAND OUEST) SAS, Le Mans (FR); STMICROELECTRONICS (ROUSSET) SAS, Rousset (FR)

( * ) Notice: Subject to any disclaimer, the term of this patent is extended or adjusted under 35 U.S.C. 154(b) by 146 days.

(21) Appl. No.: 16/898,921

(22) Filed: Jun. 11, 2020

(65) Prior Publication Data

US 2020/0409572 A1 Dec. 31, 2020

(30) Foreign Application Priority Data

Jun. 28, 2019 (FR) ...................................... 1907125

(51) Int. Cl.
*G06F 3/06* (2006.01)
*H04L 9/06* (2006.01)

(52) U.S. Cl.
CPC .......... *G06F 3/0622* (2013.01); *G06F 3/0659* (2013.01); *G06F 3/0673* (2013.01); *H04L 9/0631* (2013.01)

(58) Field of Classification Search
CPC ........................ G06F 3/06–0689; H04L 9/0631
See application file for complete search history.

(56) References Cited

U.S. PATENT DOCUMENTS

| | | | | |
|---|---|---|---|---|
| 8,306,218 | B2* | 11/2012 | Romain | H04L 9/003 380/29 |
| 9,628,146 | B2* | 4/2017 | Van Nieuwenhuyze | G06K 7/10237 |
| 2001/0052038 | A1* | 12/2001 | Fallon | G06F 1/24 710/68 |
| 2003/0093597 | A1* | 5/2003 | Marshak | G06F 3/0689 710/52 |
| 2011/0082986 | A1* | 4/2011 | Durand | G06F 13/426 711/156 |
| 2017/0090909 | A1 | 3/2017 | Guo et al. | |
| 2017/0123918 | A1* | 5/2017 | Resch | G06F 3/064 |

(Continued)

*Primary Examiner* — Nicholas J Simonetti
(74) *Attorney, Agent, or Firm* — Slater Matsil, LLP (57) ABSTRACT

A method includes receiving, by a first microprocessor, a request of modification of a content of a first memory of the first microprocessor, the first memory being accessible only by the first microprocessor. The method includes accessing, by the first microprocessor, first data associated with the request and a signature generated from the first data with an asymmetric cipher algorithm. The first data and the signature are available in a second memory of a second microprocessor, and the first data is representative of a modification to be applied to the content of the first memory. The modification is representative of a modification of a set of services exposed by the first microprocessor. The method includes verifying, by the first microprocessor, authenticity of the first data based on the signature; and modifying the content of the first memory according to the first data, the modifying being conditioned by the verifying.

20 Claims, 6 Drawing Sheets

(56) References Cited

U.S. PATENT DOCUMENTS

| | | |
|---|---|---|
| 2019/0034195 A1 | 1/2019 | Pirvu et al. |
| 2019/0034196 A1* | 1/2019 | Pirvu et al. |
| 2019/0163910 A1* | 5/2019 | Moon .................. G06F 21/572 |
| 2020/0004701 A1* | 1/2020 | Subbarao .............. G06F 3/0656 |

* cited by examiner

MODIFICATION OF A MEMORY OF A SECURE MICROPROCESSOR

CROSS-REFERENCE TO RELATED APPLICATIONS

This application claims priority to French Application No. 19/07125, filed on Jun. 28, 2019, which application is hereby incorporated herein by reference.

TECHNICAL FIELD

The present disclosure generally concerns electronic systems and more particularly electronic systems comprising a plurality of microprocessors.

BACKGROUND

Electronic systems comprising a plurality of microprocessors are known. Among such systems, the case of systems comprising at least one microprocessor behaving, for the other microprocessors of the system, as a black box, are more particularly considered herein. Such a microprocessor implements a set of functions or services, generally critical for the security of the system, for example, cipher/decipher services, also called encryption services. This set of services is made available to the other microprocessors of the system or, in other words, is exposed to the other microprocessors of the system.

The software codes of the services exposed by the microprocessor behaving as a black box are stored in a non-volatile memory, that is, a memory which is not deleted when it is no longer powered, having a content set on manufacturing or at the first programming of the memory. In other words, the content of the memory storing the software codes of the services cannot be modified.

Thus, to modify a set of services exposed by such a microprocessor, particularly after the discovery of a malfunction of one of the exposed services or on request of a client using the microprocessor, a new non-volatile memory storing the software codes of the modified set of services should be provided. Since a microprocessor is most often provided in the form of a single integrated circuit, this amounts in practice to providing a new microprocessor comprising the new non-volatile memory. The time, the human and/or hardware resources, and the cost necessary for the design and the manufacturing of such a new microprocessor may be significant, which raises a problem.

SUMMARY

In one embodiment, a method includes receiving, by a first microprocessor, a request of modification of a content of a first memory of the first microprocessor, the first memory being accessible only by the first microprocessor. The method includes accessing, by the first microprocessor, first data associated with the request and a signature generated from the first data with an asymmetric cipher algorithm. The first data and the signature are available in a second memory of a second microprocessor, and the first data is representative of a modification to be applied to the content of the first memory. The modification is representative of a modification of a set of services exposed by the first microprocessor. The method includes verifying, by the first microprocessor, authenticity of the first data based on the signature; and modifying the content of the first memory according to the first data, the modifying being conditioned by the verifying.

In one embodiment, a first microprocessor includes a processor and a non-volatile memory having a set content. The non-volatile memory comprises a program with instructions which, when they are read by the processor, cause the processor to receive a request of modification of a content of a first memory of the first microprocessor, the first memory being accessible only by the first microprocessor. The instruction further cause the processor to access first data associated with the request and a signature generated from the first data with an asymmetric cipher algorithm. The first data and the signature are available in a second memory of a second microprocessor, and the first data is representative of a modification to be applied to the content of the first memory. The modification is representative of a modification of a set of services exposed by the first microprocessor. The instruction further cause the processor to verify authenticity of the first data based on the signature; and modify the content of the first memory according to the first data, the modifying being conditioned by the verifying.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF ILLUSTRATIVE EMBODIMENTS

There is a need to overcome all or part of the disadvantages of systems comprising a plurality of microprocessors, particularly of systems comprising a microprocessor exposing a set of services stored on a non-volatile memory of the microprocessor, having a set content.

An embodiment overcomes all or part of the disadvantages of known systems comprising a plurality of microprocessors, particularly known systems comprising a microprocessor exposing a set of services stored in a non-volatile memory of the microprocessor, having a set content.

An embodiment provides a method comprising steps of: a) receiving, by a first microprocessor, a request of modification of a content of a first memory of the first microprocessor, accessible by the first microprocessor only; b) accessing, by means of the first microprocessor, to first data associated with the request and to a signature generated from the first data and from an asymmetric cipher algorithm, the first data and the signature being available in a second memory of a second microprocessor, and the first data being representative of a modification to be applied to the content of the first memory, said modification being representative of a modification of a set of services ex-posed by the first microprocessor; c) verifying, by the first microprocessor, the authenticity of the first data based on said signature; and d) modifying the content of the first memory according to the first data, the implementation of step d) being conditioned by step c).

According to an embodiment: a first indirection table is stored in the first memory, the first table comprising one or more first indexes, each of which points to a different exposed service or to a non-supported service; the first data comprise second data representative of at least a target index and a parameter having a value selected from among at least a first value and a second value; and step d) comprises: when said parameter is at the first value, a step of modifying the first table to have the first index, equal to the target index, point to a non-supported service; or when said parameter is at the second value, a step of modifying the first table to have the first index, equal to the target index, point to another service not yet exposed.

According to an embodiment, the value of the parameter is selected from among at least the first value, the second value, and a third value, step d) comprising, when the parameter is at the third value, a step of recording a software code of a new service into the first memory, and a step of modifying the first table to have the first index, equal to the target index, point to the new service.

According to an embodiment: a second indirection table is stored in the first memory, the second table comprising one or more second indexes, each of which points to an area of the first memory containing or not an update of one of the exposed services; and the value of the parameter is selected from among at least the first value, the second value, and a fourth value, step d) comprising, when the parameter is at the fourth value, a step of suppressing the update contained by the area of the first memory pointed to by the second index equal to the target index.

According to an embodiment, the value of the parameter is selected from among at least the first value, the second value, the fourth value, and a fifth value, step d) comprising, when the parameter is at the fifth value, a step of recording, in the area of the first memory pointed to by the second index equal to the target index, a software code of an update of one of the exposed services.

According to an embodiment, the first data comprise third data representative of the software code recorded, at step d), into the first memory.

According to an embodiment, the second data are data ciphered by a symmetric cipher algorithm, step d) comprising a step d1) of deciphering of the second data by the first microprocessor.

According to an embodiment, the third data are data ciphered by another symmetric cipher algorithm, step d) comprising, after step d1), a step d2) of deciphering of the third data by the first microprocessor.

According to an embodiment, the second data are further representative of a first integrity code generated on ciphering of the third data, step d2) further comprising comparing the first integrity code with a second integrity code generated on deciphering of the third data, the modification of the content of the first memory according to the first data being conditioned by said comparison.

According to an embodiment, the set of services initially exposed by the first microprocessor is determined by the content of a third non-volatile memory of the first microprocessor, preferably, a ROM, the content of the third memory being set and accessible by the first microprocessor only.

According to an embodiment, said another service not yet exposed is determined by the content of the third memory.

According to an embodiment, the update data further comprise fourth non-ciphered data indicating: the asymmetric cipher algorithm used; and/or a vector of initialization of the symmetric ciphering; and/or a size of the first data; and/or a version of the third memory and of its content.

According to an embodiment, the first memory is a volatile memory, preferably a RAM.

Another embodiment provides a microprocessor comprising a processor and a non-volatile memory having a set content, the non-volatile memory comprising instructions which, when they are read by the processor, cause the implementation of the above defined method.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, devices comprising systems with a plurality of microprocessors, one of which behaves as a black box and exposes a set of services, have not been detailed, the described embodiments being compatible with such usual devices. Further, the services capable of being exposed by such a microprocessor behaving as a black box to other microprocessors have not been detailed, the described embodiments being compatible with usual services exposed by such a microprocessor.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "substantially", and "approximately" are used herein to designate a tolerance of plus or minus 10%, preferably of plus or minus 5%, of the value in question.

Figure 1:
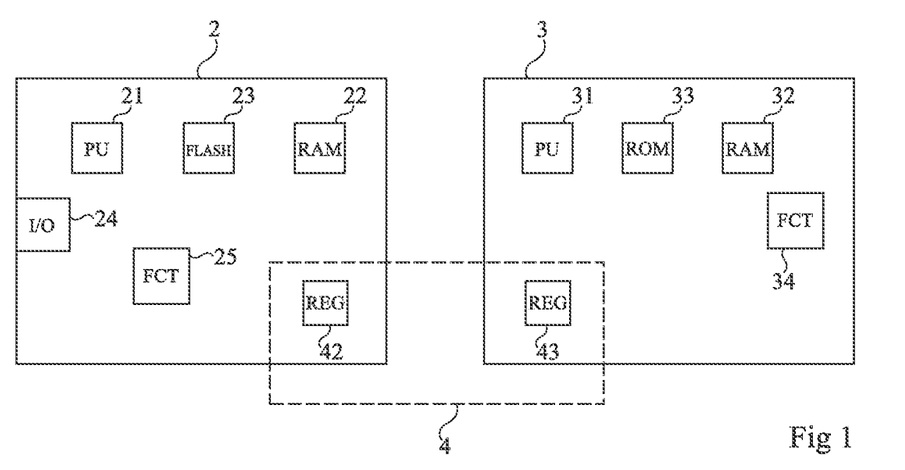
FIG. 1 very schematically shows in the form of blocks an example of an embodiment of an electronic system of the type to which the described memory modification embodiments apply.

FIG. 1 very schematically shows in the form of blocks an embodiment of an electronic system 1 of the type to which the described embodiments of modification of a memory of a microprocessor of the system apply.

Electronic system 1 comprises a plurality of microprocessors, two microprocessors 2 and 3 in the present example.

Microprocessor 3 behaves as a black box. In other words, microprocessor 3 makes a set of services or of functions available to the other microprocessors of the system without for the latter to be able to access the content of microprocessor 3. More particularly, the other microprocessors of system 1 cannot access the software codes or the hardware implementing the services exposed by microprocessord 3, nor can they access the data used and/or generated internally to microprocessor 3 for the implementation of the services.

In this embodiment, microprocessor 3 is a secure microprocessor or, in other words, a hardware secure module (HSM).

The term microprocessor here means an electronic device comprising, in a same integrated circuit, a central processing unit and at least one non-volatile memory storing instructions, which, when they are read by the central unit, cause the implementation of functions.

More particularly, in this example, microprocessor 2 comprises: a processing unit 21 (PU), for example, a state machine, a programmable logic circuit, etc.; one or a plurality of volatile storage areas, for example, a RAM-type memory 22, for example, to temporarily store information (instructions, addresses, data) during processings; one or a plurality of non-volatile storage areas, for example, a flash-type memory 23 (FLASH), to durably store information, in particular when microprocessor 2 is no longer powered; one or a plurality of data, address, and/or control buses (not shown) between the different elements internal to microprocessor 2; and an input/output interface 24 (I/O) of communication, for example, of serial bus type, with the outside of the microprocessor, for example, so as to program functions and/or record data in microprocessor 2.

Further, microprocessor 2 may integrate other functions, symbolized by a block 25 (FCT), according to the application, for example, a coprocessor, other interfaces, other memories, etc.

In the present example, microprocessor 3 comprises: a processing unit 31 (PU), for example, a state machine, a programmable logic circuit, etc.; one or a plurality of volatile storage areas 32, for example, a RAM-type memory 32, for example, to temporarily store information (instructions, addresses, data) during processings; one or a plurality of non-volatile storage areas 33, for example, a ROM-type memory 33, to durably store information, in particular when microprocessor 3 is no longer powered; one or a plurality of data, address, and/or control buses (not shown) between the different elements internal to microprocessor 3.

Further, microprocessor 3 generally integrates other functions, symbolized by a block 34 (FCT), according to the application, for example, a crypto-processor, other interfaces, other memories, etc. Preferably, microprocessor 3 integrates at least one encryption circuit, or crypto-processor, to cipher/decipher data, for example, according to an AES GCM algorithm, an AES CBC algorithm, or an RSA algorithm.

So that microprocessor 3 can expose services to microprocessor 2, and so that microprocessor 2 can require access to one of the services, microprocessors 2 and 3 share a secure interface 4.

Interface 4 for example comprises a memory or storage space 42 (REG) forming part of microprocessor 2, and a memory or storage space 43 (REG) forming part of microprocessor 3. Storages spaces 42 and 43 are preferably registers.

When microprocessor 2 desires access to a service exposed by microprocessor 3, it notifies it by a request, by modifying one or a plurality of bits of register 43.

Microprocessor 3 detects the request and reads from a specific memory area, for example, predetermined, of the memory space of microprocessor 2, for example, of memory 22, having a request descriptor recorded therein. A request descriptor corresponds in practice to data indicating to which service of microprocessor 3 microprocessor 2 desires accessing and, possibly, to the parameters determining how the called service should be implemented.

Microprocessor 3 then verifies, from an indirection table, whether the called service is one of the services of the set of services that it exposes. As an example, the indirection table comprises a plurality of service indexes, or service identifiers, each of which points to a service in the set of exposed services, or to a non-supported service. As an example, a non-supported service corresponds to a function indicating that the required service is not available. More particularly, the service indexes of the indirection table each point to an address of a memory of microprocessor 3 having the software code of the requested service stored therein, that is, the instructions which, when they are read by unit 31, cause the implementation of the service by microprocessor 3, the service being likely to be a non-supported service.

When the request is valid and the indirection table stored in microprocessor 3 comprises a service index pointing to the requested service, this service is implemented by microprocessor 3. As an example, the implementation of the requested service comprises a step of reading by microprocessor 3, from the memory space of microprocessor 2, of data to be processed on implementation of the service, for example, data to be ciphered when the called service is a data cipher service. As an example, the address having the data to be processed and the size thereof recorded therein are indicated by parameters of the request descriptor, previously read by microprocessor 3.

Microprocessor 3 then supplies microprocessor 2 with the result of the implementation of the called service. As an example, microprocessor 3 records into a memory area of microprocessor 2, for example, an area of memory 22, the data resulting from the execution of the service, for example, data ciphered when the service is a cipher service. The address where the data are recorded is for example indicated by a parameter of the request descriptor, previously read by microprocessor 3.

Preferably, microprocessor 3 also indicates the end of the processing, that is, the end of the implementation of the called service, for example by modifying one or a plurality of bits of register 42 of microprocessor 2.

Thus, microprocessor 2 does not access the content of microprocessor 3, that is, the content (instructions and data) of memories 32 and 33 of microprocessor 3.

Although a system 1 comprising a single secure microprocessor 3 and a single non-secure microprocessor 2 capable of calling the services exposed by microprocessor 3 has been described herein, the system may comprise other secure microprocessors, and/or other non-secure microprocessors. In such a system, each time a secure microprocessor exposes a set of services to another microprocessor of the system, an interface of the type of interface 4 is provided between the two microprocessors, and the operation described above in relation with FIG. 1 is implemented. This enables the content of the secure microprocessor not to be accessible to the microprocessors of the system. Further, although this is not detailed herein, a same secure microprocessor of the system may expose its set of services to a plurality of other microprocessors of the system.

Figure 2:
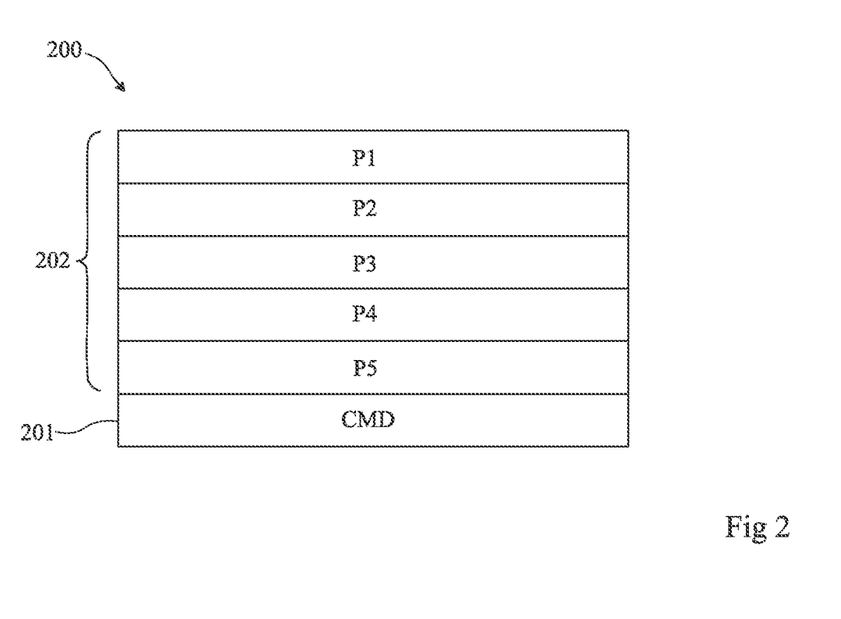
FIG. 2 schematically shows an embodiment of data used in the system of FIG. 1, to request an implementation of a service exposed by a microprocessor of the system of FIG. 1.

FIG. 2 schematically shows an embodiment of data 200 used in the system of FIG. 1, and more particularly an embodiment of a request descriptor 200.

Data 200 are representative of an identifier 201 (CMD) of the called service, for example a binary code identifying the called service.

Data 200 are also representative of parameters 202, in the present example, five parameters P1, P2, P3, P4, and P5, representative of the way in which the called service should be implemented. According to the called service, some of these parameters may be zero, that is, unused. As an example, when the called service is a service of data ciphering by an AES ECB algorithm: parameter P1 is representative of the key to be used for the ciphering, for example, of an identifier of a key stored in microprocessor 3; parameter P2 is representative of a beginning address of an area of the memory space of microprocessor 2 where the data to be ciphered are stored, for example an address of memory 22; parameter P3 is representative of a beginning address of an area of the memory space of microprocessor 2 where the data ciphered by microprocessor 3 will be recorded to written, for example an address of memory 22; parameter P4 is representative of the size of the data to be ciphered; and parameter P5 is not used.

As a result of the transmission by microprocessor 2, via interface 4, of a request of access to a service exposed by microprocessor 3, data 200 are read by microprocessor 3 from a predefined memory address of the memory space of microprocessor 2, for example, from a predefined address of memory 22. The predefined address is preferably the same whatever the called service, that is, the same for each request transmitted, via interface 4, from microprocessor 2 to microprocessor 3. Preferably, the address is defined on design of system 1, and more particularly on design of microprocessor 3. Microprocessor 2 is then for example designed or programmed to record at this predefined address of its memory space, each time it transmits a request of access to a service exposed by microprocessor 3, the corresponding request descriptor.

Although a request descriptor 200 comprising five parameters P1 to P5 has been described herein, in alternative embodiments request descriptor 200 comprises any non-zero number of parameters, preferably at least two parameters, that is a memory address where the data are stored and a size of the stored data.

In the following description, the case where software codes of the services exposed by microprocessor 3 are recorded into memory 33 of microprocessor 3 having a set content is considered. It is further considered that the table of indirection between the service indexes and the respective services (supported or not) corresponding to such service indexes, is initialized based on the content of non-volatile memory 33, and is recorded into volatile memory 32.

In system 1, it could be devised to modify the set of services exposed by microprocessor 3 by modifying the content of its memory 33. However, this is not possible due to the fact that the content of memory 33 is set, that is, can no longer be modified.

As an example, when memory 33 is a memory having a content capable of being reprogrammed, for example, a flash-type memory, microprocessor 3 comprises no interface allowing such a reprogramming of its content. Indeed, by reprogramming part of the content of memory 33, malicious individuals could access confidential data stored therein, particularly information relative to the operation of the services exposed by microprocessor 3.

Still as an example, when memory 33 is a ROM, its content cannot be modified and is determined on manufacturing of memory 33, for example, due to the masks used to manufacture the memory.

To modify or vary the set of services exposed by microprocessor 3, a new memory 33 with a new set content corresponding to the modified set of services may be provided, which implies, in practice, providing a new microprocessor 3. This causes various disadvantages, particularly in terms of design time, resources, and of cost associated with the provision of new microprocessor 3.

The inventors here provide securely varying the set of services exposed by microprocessor 3, by securely modifying memory 32 of microprocessor 3. More particularly, the inventors provide modifying, in memory 32, the table of indirection between the service indexes and the respective services (supported or not) pointed to by the indexes.

More particularly, to avoid exposing the content of microprocessor 3 to malicious individuals, the inventors provide for the modification of memory 32 of microprocessor 3 to be performed as a response to a request by microprocessor 2, via secure interface 4, of access to a service of modification of memory 32. Preferably, the software code corresponding to such a service of modification of memory 32 is recorded into non-volatile memory 33 of microprocessor 3. The modification to be applied to memory 32 is for example programmed in microprocessor 2, preferably in a non-volatile memory of microprocessor 2, by an authorized person, for example, by the manufacturer of microprocessor 3 or by a person authorized by the latter. Due to the fact that memory 32 is a volatile memory, such a modification of memory 32 is preferably implemented for each powering on or starting of system 1.

The inventors here take advantage of the operation of microprocessor 3, and more generally of system 1, enabling microprocessor 2 to securely call, via interface 4, the services exposed by microprocessor 3.

Figure 3:
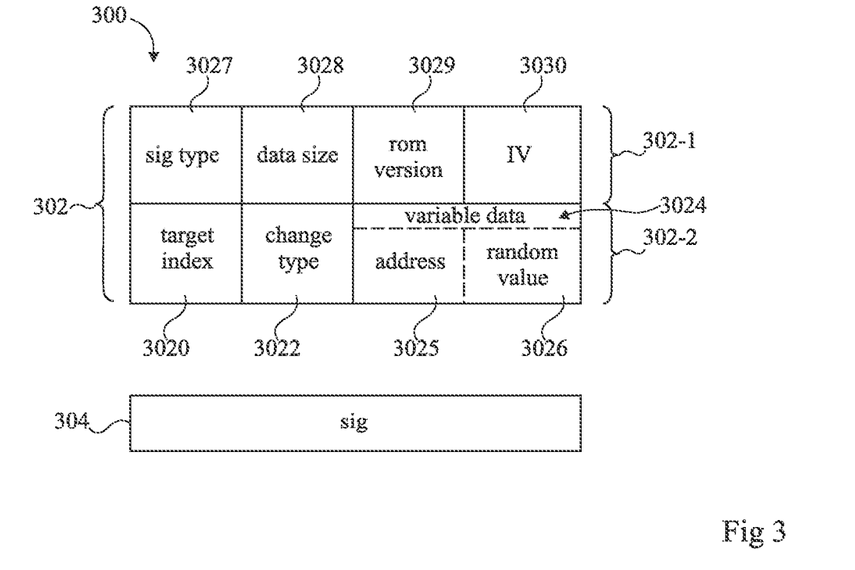
FIG. 3 schematically shows an embodiment of data used in the system of FIG. 1, to implement a modification of a memory of a microprocessor of the system.

FIG. 3 schematically shows an embodiment of data 300 used in the system of FIG. 1 to implement a modification of a memory of a secure microprocessor, in the present example a modification of memory 32 of microprocessor 3 of FIG. 1.

In the present embodiment, memory 33 of microprocessor 3 comprises the software codes of the services exposed by microprocessor 3 to the other microprocessors of system 1, each of the exposed services being pointed to by a corresponding service index of the indirection table. It is further considered that memory 33 of microprocessor 3 comprises one or a plurality of software codes corresponding to one or a plurality of respective services which are not exposed by microprocessor 3. In other words, on design of microprocessor 3, and more particularly of its memory 33, additional services which might become, if need be, services exposed by microprocessor 3, are provided.

Data 300 are stored in microprocessor 2.

According to an embodiment, the memory address or the memory location having data 300 recorded therein is preferably indicated by a parameter of the request descriptor (FIG. 2), for example, parameter P1, that microprocessor 3 reads, from microprocessor 2, due to the reception, via interface 4, of a request of access to a service exposed by microprocessor 3.

According to an embodiment, another parameter of the request descriptor, for example, parameter P2, indicates the size of data 300.

As an example, data 300 are recorded into memory 22. The recording of data 300 into memory 22 results for example from a copying, into memory 22, of data recorded in memory 23 of microprocessor 2. The data recorded into memory 23 have for example been generated by an authorized person, and then programmed in memory 23 of microprocessor 2.

Data 300 comprise data 302 representative of the modification to be performed in memory 32 of microprocessor 3. Data 300 further comprise a signature 304 ("sig").

Signature 304 has been generated by a person authorized to request a modification of memory 32 of microprocessor 3.

Signature 304 has been generated based on all or part of data 302, preferably based on all the data 302, by means of an asymmetric cipher algorithm, preferably an RSA cipher algorithm. In particular, the authorized person holds the private key, and the corresponding public key is known by microprocessor 3, for example, stored in microprocessor 3.

Data 302 are representative of a target index 3020 ("target index") having the modification of memory 302 applying thereto. In this embodiment, target index 3020 corresponds to a service index of the table of indirection between the service indexes and their respective software codes.

Data 302 are further representative of a parameter 3022 ("change type") having its value determining the type of modification to be implemented in memory 32.

In this embodiment, the value of parameter 3022 is selected from a first value RS and a second value IR. When parameter 3020 is at value RS, this means that the exposed service pointed to by the service index equal to target index 3020 should be suppressed from the set of exposed services, by having the service index point to a non-supported service, that is, for example, the function indicating that the required service is not available. When parameter 3020 is at value IR, this means that the exposed service pointed to by the service index equal to target index 3020 should be replaced with a preexisting service recorded in memory 33, preferably a preexisting service which has not been exposed yet. In practice, one or the other of the above modifications corresponds to a modification of the table of indirection between the service indexes and the respective services (supported or not) having the service indexes pointing thereto. This thus corresponds to a modification of memory 32 having the indirection table stored therein.

Data 302 are also representative of variable data 3024 ("variable data"). The content of variable data 3024 particularly depends on the value of parameter 3022 or, in other words, variable data 3024 represent different information according to the value of parameter 3022.

According to an embodiment, when parameter 3022 is at value IR, variable data 3024 comprise address 3025 ("address"), in memory 33, of the service, not yet exposed, which will have the service index equal to target index 3020 point thereto after the modification of memory 32. Preferably, variable data 3024 have a fixed size, and possibly comprise filling data 3026 ("random value"). When parameter 3022 is at value RS, variable data 3024 only comprise filling data 3026. Preferably, filling data 3026 are randomly generated, which makes attacks by malicious individuals more difficult, particularly when signature 304 has been generated based on at least variable data 3024.

Data 302 may be representative of a lot of other information.

Preferably, data 302 are particularly representative of the type 3027 ("sig type") of algorithm used to generate signature 304.

Preferably, data 302 are in particular representative of the total size 3028 ("data size") of data 302, that is, of the size of data 300 without key 304.

Preferably, data 302 are particularly representative of version 3029 ("rom version") of the non-volatile memory 33 of microprocessor 3. Indeed, the set content of memory 33 may be different from one version to another of memory 33. In particular, this may enable to identify, when parameter 3022 is at value IR, that address 3025 does not correspond to the address of a service recorded in memory 33.

According to a preferred embodiment, as illustrated in FIG. 3, data 302 comprise non-ciphered data 302-1 and ciphered data 302-2. Preferably, data 302-2 have been ciphered by a symmetric cipher algorithm, for example, of AES type, preferably of AES CBC type. Preferably, the AES-type algorithm uses a randomly generated initialization vector 3030 ("IV"). Non-ciphered data 302-1 are then representative of initialization vector 3030. According to an embodiment, the AES-type algorithm use the entire non-ciphered data 302-1 as an initialization vector.

This makes attacks by malicious individuals more difficult, due to the fact that the critical data or parameters of the modification to be applied to memory 32, that is, the type 3022 of modification to be implemented, the target index 3020 concerned by the modification and, if need be, the address 3025 of a preexisting service recorded in memory 33, are ciphered.

Preferably, the size of data 302-1 and 302-2 is set and identical whatever the requested modification of memory 32.

Figure 4:
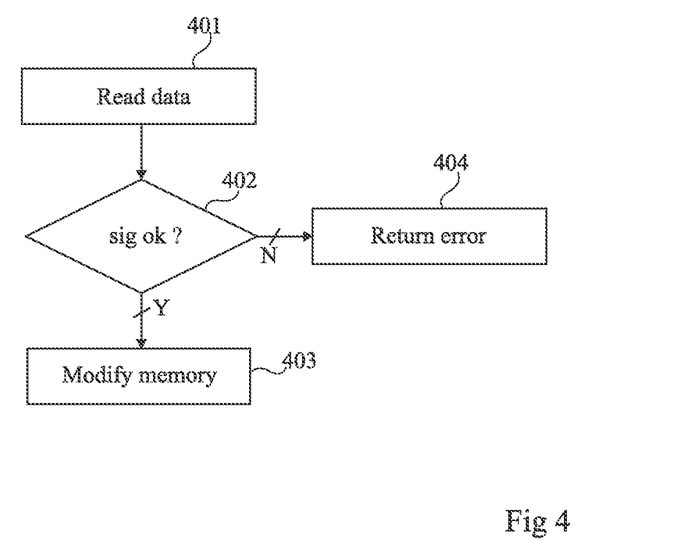
FIG. 4 schematically shows in the form of blocks an embodiment of a method of updating a memory of a microprocessor of the system of FIG. 1.

FIG. 4 schematically shows in the form of blocks an embodiment of a modification of a memory of a microprocessor, in the present example, of memory 32 of microprocessor 3.

At a step 401 (block "Read data"), as a response to the reception, via interface 4 (FIG. 1), of a request of access to a secure service, microprocessor 3 will read from the address indicated by a request descriptor, for example the address indicated by parameter P1 of request descriptor 200 of FIG. 2, the data representative of the modification to be implemented in memory 32, for example, data 302 described in relation with FIG. 3. Further, at step 401, microprocessor 3 reads a signature associated with the data representative of the modification to be implemented in memory 32, for example, the signature 304 associated with data 302. The signature associated with the data representative of the modification to be applied in memory 32 has been generated, by a person authorized to request a modification of memory 32, from an asymmetric cipher algorithm, from all or part of the data, and from a private key held by the authorized person.

At a next step 402 (block "sig ok?"), microprocessor 3 verifies from data 302 and signature 304 whether the request of modification of its memory 32 is authentic, that is, whether data 302 have effectively been generated by an authorized person.

For this purpose, microprocessor 3 generates intermediate data, currently called hash, from data 302. Microprocessor 3 deciphers signature 304 with its public key, for example, by means of an adapted deciphering circuit of microprocessor 3 (block 34, FIG. 1). Microprocessor 3 then verifies that the deciphered signature is identical to the generated hash.

If it is not (output N of block 402), the method carries on to a next step 404 (block "Return error") marking the end of the method, and memory 32 is not modified. Preferably, at step 404, microprocessor 3 notifies microprocessor 2 that it has not performed the requested modification of memory 32, for example, via interface 4, for example, by modifying one or a plurality of bits of register 42 of microprocessor 2.

If it is identical (output Y of block 402), data 302 are authentic. Further, data 302 are unaltered, that is, they have not been modified since the signature has been generated by an authorized person. The method then carries on to a next step 403 (block "Modify memory") where microprocessor 3 implements a modification of memory 32 according to data 302. For example, microprocessor 3 modifies the table of indirection between service indexes and respective services (supported or not) having these indexes pointing thereto, by modifying the service having a service index concerned by the modification pointing thereto. Preferably, once memory 32 has been modified, microprocessor 3 notifies microprocessor 2 thereof, for example, via interface 4, for example, by modifying one or a plurality of bits of register 42 of microprocessor 2.

According to an embodiment where data 302 comprise ciphered data 302-2, step 403 comprises a step of deciphering data 302-2, for example, by means of an adapted deciphering circuit of microprocessor 3 (block 34, FIG. 1).

According to an embodiment where the data are particularly representative of version 3029 ("rom version") of the non-volatile memory 33 of the microprocessor 3, step 401 includes a step of verifying that version 3029 indicated by data 302 corresponds to the version of the non-volatile memory 33 of the microprocessor. If this is not the case, the method may be interrupted.

According to an embodiment, step 401 may comprise a verification that the signature has an expected size. If this is not the case, the method may be interrupted.

The above-described method enables to modify the set of services exposed by microprocessor 3, without having to modify the content of memory 33, which would not be possible due to the fact that this content is set.

Further, such a modification is securely implemented, due to the fact that only an authorized person holding the private key can generate the signature associated with the data representative of the modification to be implemented in memory 32. The signature and the data associated therewith are then recorded into microprocessor 2 and microprocessor 2 is programmed to transmit the corresponding data of modification of memory 32.

Further, such a modification of memory 32, which is representative of a modification of the set of services exposed by microprocessor 3, uses a secure method of calling the service of modification of memory 32, that is, the method of secure call of any of the services exposed by microprocessor 3.

Figure 5:
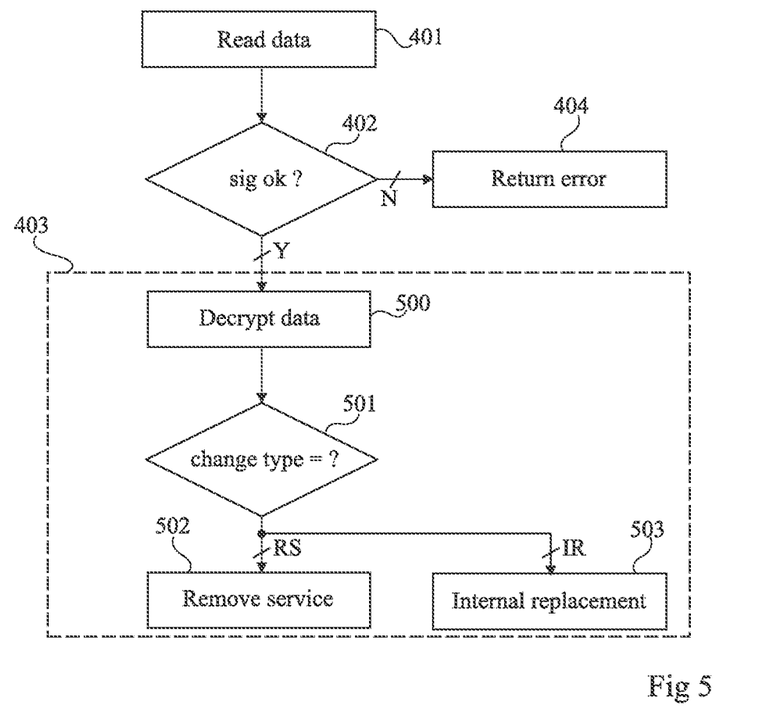
FIG. 5 shows in more detailed fashion and in the form of blocks the method of FIG. 4.

FIG. 5 shows in further detail and in the form of blocks the method of FIG. 4. More particularly, FIG. 5 shows in more detailed fashion the implementation of the method of FIG. 4, based on data 300 described in relation with FIG. 3. In this embodiment, it is considered that data 300 comprise ciphered data 302-2 and non-ciphered data 302-1.

At step 401, microprocessor 3 reads, from microprocessor 2, data 300 as described in relation with FIG. 4.

At step 401, according to an embodiment where data 302-1 are representative of size 3028 of data 300 (FIG. 3), preferably, microprocessor 3 verifies the size of data 300. For example, the microprocessor compares data size 3028 with the size of data 300 indicated in the request descriptor, for example, request descriptor 200 of FIG. 2, for example, the size indicated by parameter P2 of descriptor 200. If the data sizes are not equal to each other, microprocessor 3 interrupts the method of modification of its memory 32, for example, similarly to what has been described in relation with step 404 described in relation with FIG. 4.

At step 401, according to an embodiment where data 302-1 are representative of size 3028 of data 300 (FIG. 3), preferably, microprocessor 3 verifies that it has enough free storage space in memory 32 to manipulate data 300, that is, for example, to record data 302 therein. If not, microprocessor 3 interrupts the method of modification of its memory 32, for example, similarly to what has been described in relation with step 404 described in relation with FIG. 4.

At step 401, in addition to reading data 302, according to an embodiment where data 302-1 are representative of version 3029 of the memory 33, preferably, microprocessor 3 verifies that it comprises the right version 3029 of memory 33. If not, microprocessor 3 interrupts the method of modification of its memory 32, for example, similarly to what has been described in relation with step 404 described in relation with FIG. 4.

At step 401, preferably, microprocessor verifies that the signature 304 has the expected size. If not, microprocessor 3 interrupts the method of modification of its memory 32, for example, similarly to what has been described in relation with step 404 described in relation with FIG. 4.

At step 401, microprocessor 3 may implement a step comprising importing data 300 into its memory 32, and more particularly data 302-1 and 302-2. The step of importing data 302-1 and 302-2 may be conditioned by the step of verifying the size of data 300 and/or the size of the signature such as described hereabove.

The microprocessor then implements step 402 described in relation with FIG. 4. Preferably, the way in which step 402 is implemented is determined by the type of asymmetric cipher algorithm used to generate signature 304, non-ciphered data 302-1 being then representative of the type 3027 of the algorithm.

Step 403 here starts with a step 500 (block "Decrypt data") of deciphering the ciphered data 302-2, for example, by means of an adapted deciphering circuit of microprocessor 3 (block 34, FIG. 1).

According to an embodiment where data 302-2 have been ciphered by a symmetric cipher algorithm using an initialization vector, microprocessor 3 deciphers data 302-2 by using the same initialization vector, non-ciphered data 302-1 being representative of initialization vector 3030. Preferably, microprocessor 3 deciphers data 302-2 using the entire data 302-1 as initialization vector.

Step 403 further comprises a next step 501 (block "change type=?") where, based on the data 302-2 deciphered at step 500, microprocessor 3 determines which type of modification of memory 32 should be implemented. To achieve this, microprocessor 3 checks which value, in this embodiment, IR or RS, parameter 3022 is equal to.

If parameter 3022 is at value RS (output RS of block 501), the method carries on at a next step 502 (block "Remove service") of step 403. At step 502, microprocessor 3 modifies the table of indirection between the service indexes and the respective services (supported or not) pointed to by the indexes, that is, it modifies the content of its memory 32 having the indirection table stored therein. More precisely, microprocessor 3 searches from the indirection table the service index which is equal to target index 3020, and modifies the address having the service index pointing thereto so that it points towards the address of a non-supported service, that is, for example, the address of the function indicating that the required service is not available. In other words, microprocessor 3 has the service index equal to target index 3020 point to the non-supported service. This amounts to suppressing a service from the set of services exposed by microprocessor 3.

If parameter 3022 is at value IR (output IR of block 501), the method carries on to a next step 503 (block "Internal replacement") of step 403. At step 503, microprocessor 3 modifies the table of indirection between the service indexes and the respective services (supported or not) pointed to by the indexes, that is, it modifies the content of its memory 32 having the indirection table stored therein. More precisely, microprocessor 3 searches from the indirection table the service index which is equal to target index 3020, and modifies the address having the service index pointing thereto so that it points to address 3025 of the software code of a service recorded into memory 33 but not exposed yet by microprocessor 3. In other words, microprocessor 3 has the service index equal to target index 3020 point to a service preexisting in memory 33 but no exposed yet by microprocessor 3. If, before the modification of the indirection table, the service index was pointing to a non-supported service, this amounts to adding a service to the set of services exposed by microprocessor 3. If, before the modification of the indirection table, the service index was pointing to a service in the set of services exposed by microprocessor 3, this amounts to replacing the service with another service.

Steps 502 and 503 mark the end of the memory modification method, the steps ending as described in relation with step 403 of FIG. 4.

According to an alternative embodiment, it is provided to be able to add a service which is not preexisting in memory 33 of microprocessor 3 to the set of services exposed by microprocessor 3.

To achieve this, the inventors provide for data 300 to comprise, in addition to what has been described in relation with FIG. 3, the software code corresponding to the new service and, further, for the software code to be imported into memory 32. The table of indirection between the service indexes and the software codes of the corresponding services is then modified so that one of the indexes points to the imported software code, that is, towards the address of memory 32 having the software code stored therein.

In particular, in this variation, the parameter 3022 indicating which type of modification of memory 32 should be implemented is provided to be able to take value RS, value IR, and also a value IS. When the parameter is at value IS, this means that the modification to be implemented in memory 32 comprises recording therein the software code of a new service, and accordingly modifying the table of indirection between the service indexes and the software codes of the corresponding services, so that the new service is exposed by microprocessor 3.

This variation will now be described in further detail in relation with FIGS. 6 and 7.

Figure 6:
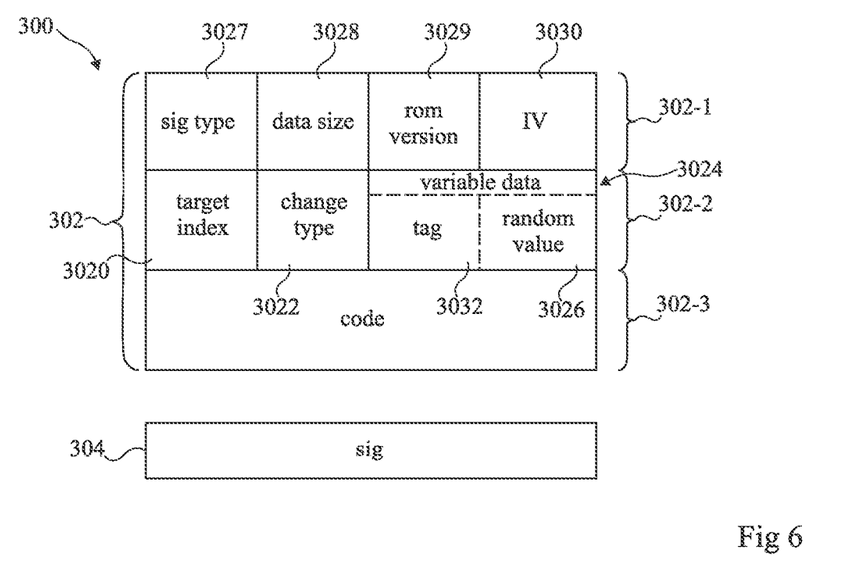
FIG. 6 schematically shows an alternative embodiment of the data of FIG. 3.

FIG. 6 shows the data 300 described in relation with FIG. 3, in the case where parameter 3022 is at value IS. Only the differences between data 300 of FIG. 3 and data 300 of FIG. 6 are here highlighted.

In FIG. 6, data 300, and more particularly data 302, comprise data 302-3 representative of the software code of the new service, in addition to non-ciphered data 302-1 and to ciphered data 302-2.

According to a preferred embodiment, data 302-3 have been ciphered, for example, by a symmetric cipher algorithm, for example, of AES type, preferably by using initialization vector 3030 or all of the data 302-1 (comprising initialization vector 3030) as initialization vector.

The provision of the ciphering of the software code of the new service enables to avoid for the software code to be read out by malicious individuals, for example, to deduce therefrom information relative to the internal operation of microprocessor 3 and/or relative to the operation of the new service.

According to an even more preferred embodiment, data 302-3 have been ciphered prior to data 302-2 and, on ciphering of data 302-3, for example, by means of an algorithm of AES GCM type, an integrity code 3032 ("tag") has been generated. Variable data 3024 are then representative of integrity code 3032 and, possibly, of filling data 3026.

The provision of such an integrity code 3032 enables to ensure that the software code of the new service has not been modified by a malicious individual, for example, a person which would desire to import a malware code into microprocessor 3 to obtain, on execution of the malware, information relative to the internal operation of microprocessor 3.

According to an embodiment, when data 302 comprise data 302-3, signature 304 has been generated from data 302-1, 302-2, and 302-3. It could then be believed that the provision of an integrity code 3032 is redundant with the provision of the signature 304 obtained by asymmetric ciphering, particularly as concerns the integrity of the software code of the new service. However, integrity code 3032 enables to avoid for a malware code to be imported into microprocessor 3 even in the case where a malicious individual would have succeeded in falsifying signature 304.

In the alternative embodiment illustrated in FIG. 6, in the case where parameter 3022 has value IR or RS, data 300 do not comprise data 302-3, and are then similar to the data 300 described in relation with FIG. 3.

Figure 7:
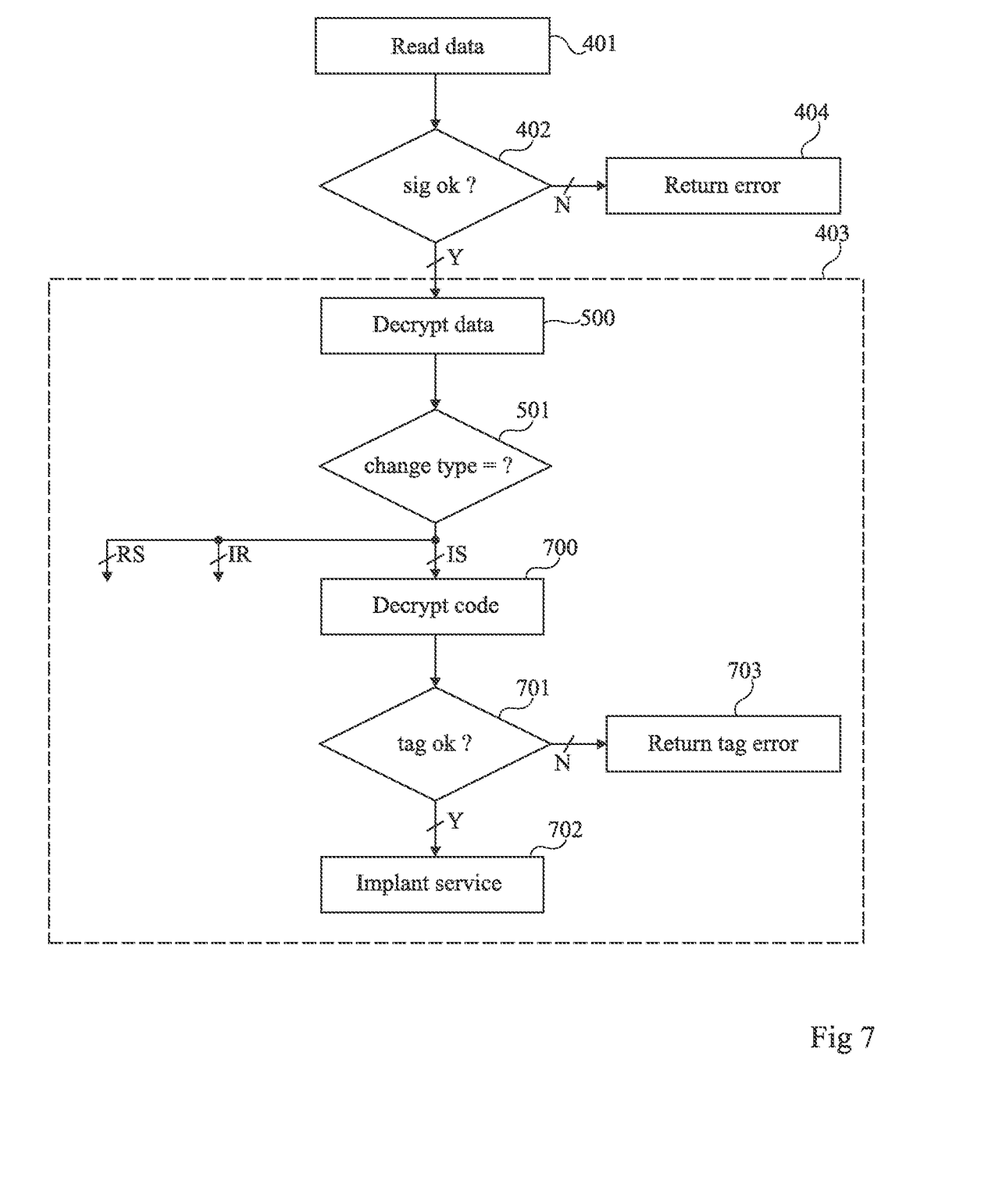
FIG. 7 shows in the form of blocks an alternative embodiment of the method of FIG. 5.

FIG. 7 illustrates in the form of blocks an alternative embodiment of the method of FIG. 5. Only the differences between the method of FIG. 5 and that of FIG. 7 are here highlighted.

Steps 401, 402, 404 are similar or identical to those described in relation with FIG. 5.

Step 403 starts, as in FIG. 5, with step 500, during which microprocessor 3 deciphers data 302-2.

Step 403 comprises the next step 501 in which microprocessor 3 determines what type of modification of memory 32 should be implemented. To achieve this, microprocessor 3 checks which value, in this alternative embodiment, IR, RS, or IS, parameter 3022 is equal to.

If parameter 3022 is at value RS (output RS of block 501), step 403 carries on at step 502 (not shown), as described in relation with FIG. 5. In this alternative embodiment, if, at step 502, the software code of the service pointed to by the service index equal to target index 3020 is recorded in memory 32, preferably, microprocessor 3 orders the suppression of the software code from memory 32, to free storage space in memory 32.

If parameter 3022 is at value IR (output IR of block 501), step 403 carries on to step 503 (not shown), as described in relation with FIG. 5.

If parameter 3022 is at value IS (output IS of block 501), step 403 carries on to a step 700 (block "Decrypt code"). At step 700, microprocessor 3 imports data 302-3 representative of the software code to be implanted into memory 32 and, preferably, at the same time as it imports data 302-3, deciphers data 302-3, for example by means of an adapted deciphering circuit of microprocessor 3 (block 34, FIG. 1). The deciphered data 302-3, that is, the software code of the new service, are then recorded in memory 32.

According to an embodiment where data 302-3 have been ciphered by a symmetric cipher algorithm using an initialization vector, microprocessor 3 deciphers data 302-2 by using the same initialization vector, non-ciphered data 302-1 being representative of initialization vector.

According to an embodiment where an integrity code 3032 has been generated on ciphering of the software code of the new service to obtain data 302-3, on deciphering of data 302-3 by microprocessor 3, another integrity code is generated. In this embodiment, after step 700, step 403 then carries on at a step 701 (block "tag ok?") in which the microprocessor verifies that the integrity code 3032 recovered by deciphering data 302-3 is identical to the integrity code generated on deciphering of data 302-3. If it is (output Y of block 701), step 403 carries on to a step 702 (block "Implant service"). If it is not (output N of block 701), step 403 carries on to a step 703 (block "Return tag error"), similar to step 404.

Preferably, at step 703, microprocessor 3 notifies microprocessor 2 that the required modification of memory 32 has not been performed, for example, via interface 4, for example, by modifying one or a plurality of bits of register 42 of microprocessor 2.

Further, at step 703, preferably, microprocessor 3 deletes the software code which has been recorded into memory 32 at step 700.

According to an embodiment where, on ciphering of the software code of the new service to obtain data 302-3, no integrity code 3032 has been generated, on deciphering of data 302-3 by microprocessor 3, no other integrity code is generated. In this embodiment, after step 700, step 403 then directly carries on to step 702.

At step 702, microprocessor 3 adds, in its set of exposed services, the service having had its software code recorded into memory 32 at step 700. For this purpose, microprocessor 3 modifies the table of indirection between the service indexes and the software codes of the services (supported or not) pointed to by the service indexes. More particularly, microprocessor 3 has the service index which is equal to target index 3020 point to the address of memory 32 where the software code of the new service has been recorded. In other words, microprocessor 3 has the service index equal to target index 3020 point to the new service. This amounts to adding new a service to the set of services exposed by microprocessor 3.

Step 702 marks the end of the method of modification of memory 32, and ends as described in relation with step 403 of FIG. 4.

In addition to what has been previously described, it is considered that a service having its software code recorded in memory 33 of microprocessor 3, or possibly in memory 32 of microprocessor 3, may comprise an indirection point. Thus, on execution of the software code by microprocessor 3, the execution is interrupted at the indirection point. At the indirection point, the service comprises a test to verify whether a software code corresponding to an update of the service, that is, a software patch, is available in memory 32 and should be executed from the indirection point.

In this variation, microprocessor 3 comprises an indirection table comprising update indexes, each of which points or not to an update, that is, to a software code corresponding to an update. Note that an update may correspond to a software code stored in the non-volatile memory 32 of microprocessor 3, such an update then corresponding to an initial portion of the code of a service stored in memory 32 and allowing the implementation of this service. When an update index points to no update, the index for example points to a function, that is, software code, indicating that no update is available for this index. The table of indirection between update indexes and the corresponding updates is initialized based on the content of non-volatile memory 33. The indirection table is recorded into volatile memory 32.

Thus, on execution of a service comprising an indirection point, when microprocessor 3 reaches the indirection point, it verifies, in the table of indirection between update indexes and updates, whether the update index corresponding to the indirection point points or not to an update. If the update index points to an update, that is, to the software code of this update, it executes it. At the end of the execution of the update, the execution of the service may be resumed after the indirection point. If the update index points to no update, the execution of the service carries on.

The provision of one or a plurality of indirection points in the software code of a service enables to modify a portion only of the execution of the service due to an update of the code to be executed when the microprocessor reaches an indirection point. This particularly enables to anticipate modifications of the service, for example, to correct a possible malfunction of the service or to satisfy a request from a user of microprocessor 3.

The inventors provide, in this alternative embodiment, being able to suppress an update of a service by having the corresponding update index point to no update. In this variation, the inventors also provide being able to import a new update into memory 32, by recording the software code of the new update and by having the corresponding update index point to the software code, and thus to the new update.

Thus, in this variation, parameter 3022 (FIGS. 3 and 6) can take two additional values, that is, values RP and IP.

When parameter 3022 is at value RP, this means that the table of indirection of the update indexes towards the corresponding updates should be modified, so that the update index equal to target index 3020 points to no update. In this case, data 300 are of the type of those described in relation with FIG. 3, with the difference that target index 3020 corresponds to an update index rather than to a service index. Data 302 comprise no data 302-3. Further, in this case, variable data 3024 only comprise filling data 3026.

When the parameter 3022 is at value IS, this means that the modification to be implemented in memory 32 comprises recording into it the software code of a new service, and accordingly modifying the table of indirection between the service indexes and the software codes of the corresponding services, so that the new service is exposed by microprocessor 3.

When parameter 3022 is at value IP, this means that the modification to be implemented in memory 32 comprises recording therein the software code of a new update and accordingly modifying the table of indirection between the update indexes and the updates pointed to by the indexes. More particularly, the indirection table is modified so that the update index equal to target index 3020 points to the new update, that is, to the software code of the new update, more precisely, to the address of memory 32 where the software code is recorded. In this case, data 300 are of the type of those described in relation with FIG. 6, with the difference that target index 3020 then corresponds to an update index, rather than to a service index. Data 302-3 are then representative of the software code of the new update.

What has been described in relation with FIG. 6 concerning data 302 in the case where data 302-3 are representative of the software code of a new service, in particular the advantages of data 302, also applies when data 302-3 are representative of the software code of a new update.

Figure 8:
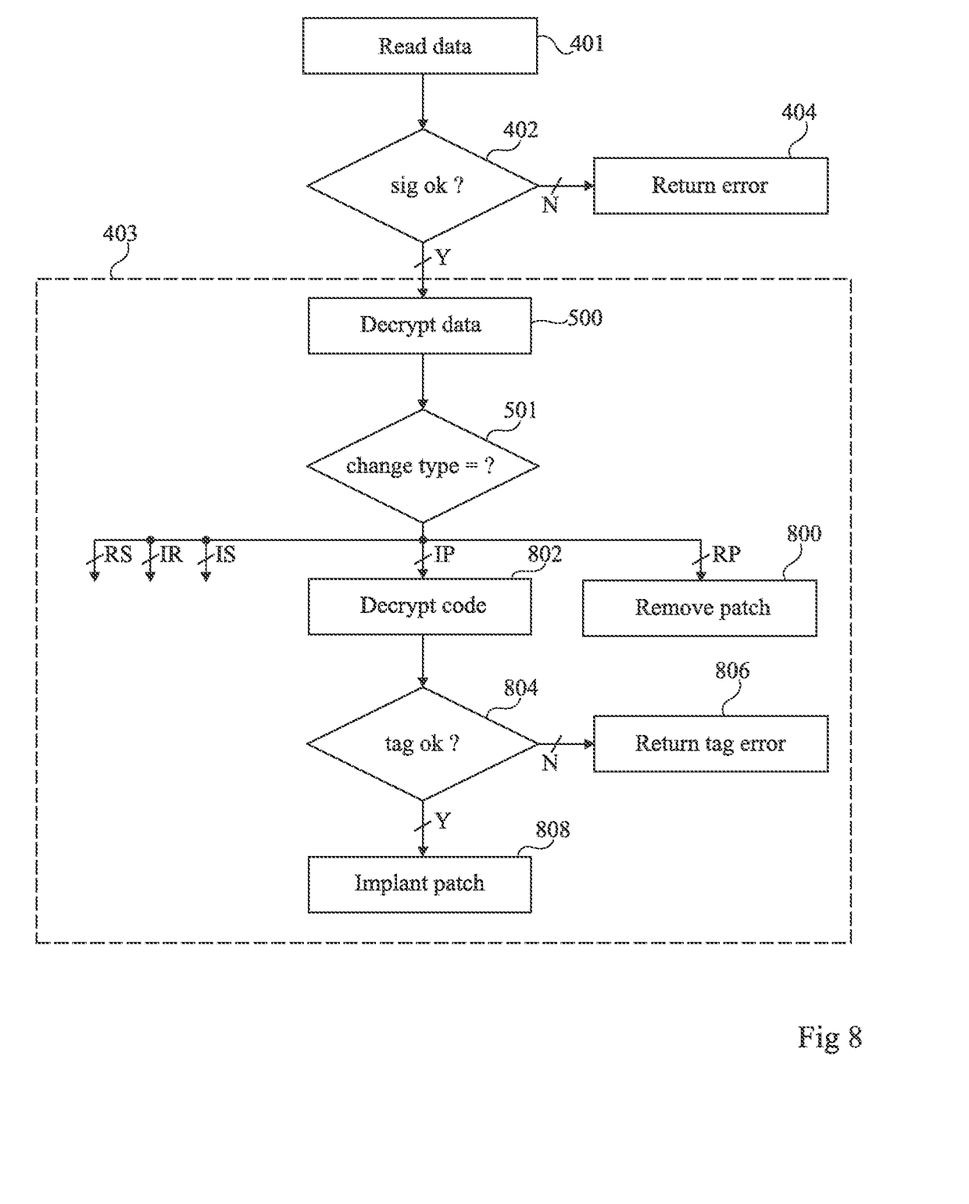
FIG. 8 shows in the form of blocks still another alternative embodiment of the method of FIGS. 5 and 7.

FIG. 8 shows, in the form of blocks, an alternative embodiment of the method of FIGS. 5 and 7, in the case where parameter 3022 may take values IP and RP. More particularly, in this variation, parameter 3022 may take value RS, value IR, value IS, value IP, or value RP.

Only the differences between the method of FIG. 7 and that of FIG. 8 are here highlighted.

Steps 401, 402, 404 are identical to those described in relation with FIG. 7.

Step 403 starts, as in FIG. 7, with step 500 during which microprocessor 3 deciphers data 302-2.

Step 403 comprises the next step 501 in which microprocessor 3 determines what type of modification of memory 32 should be implemented. To achieve this, microprocessor 3 checks which value, in this alternative embodiment, IR, RS, IS, IP, or RP, parameter 3022 is equal to.

If parameter 3022 is at value RS (output RS of block 501), step 403 carries on at step 502 (not shown), as described in relation with FIG. 5.

If parameter 3022 is at value IR (output IR of block 501), step 403 carries on at step 503 (not shown), as described in relation with FIG. 5.

If parameter 3022 is at value IS (output IS of block 501), step 403 carries on at step 700 (not shown), as described in relation with FIG. 7.

If the parameter is at value RP (output RP of block 501), step 403 carries on at a step 800 (block "Remove patch"). At step 800, microprocessor 3 modifies the table of indirection between the update indexes and the corresponding updates, that is, modifies the content of its memory 32 where the indirection table is stored. More precisely, microprocessor 3 has the update index equal to target index 3020 point to an address which does not correspond to any update, for example to the address of a function indicating that no update is available for this index. This amounts to the fact that the update index points to no update, and thus to suppressing the update to which it was previously pointing. Preferably, at step 800, microprocessor 3 deletes the software code of the update to which, before the modification of the indirection table, the update index equal to target index 3020 was pointing. Then, step 800, and more generally the method of modifying memory 32, ends as described in relation with step 403 of FIG. 4.

If the parameter is at value IP (output IP of block 501), step 403 carries on at a step 802 (block "Decrypt code"). Step 802 is similar or even identical to step 700 described in relation with FIG. 7.

According to an embodiment where data 302-3 have been ciphered by a symmetric cipher algorithm using an initialization vector 3030, microprocessor 3 deciphers data 302-2 by using the same initialization vector, non-ciphered data 302-1 being representative of initialization vector 3030.

According to an embodiment where, on ciphering of the software code of the new update to obtain data 302-3, an integrity code 3032 has been generated, on deciphering of data 302-3 by microprocessor 3, another integrity code is generated. In this embodiment, after step 802, step 403 then carries on at a step 804 (block "tag ok?") similar or identical to step 701 described in relation with FIG. 7. More particularly, at step 804, the microprocessor verifies that the integrity code 3032 contained by the deciphered data 302-2 is identical to the integrity code generated on deciphering of data 302-3. If it is (output Y of block 804), step 403 carries on to a step 808 (block "Implant patch"). If it is not (output N of block 804), step 403 carries on to a step 806 (block "Return tag error"), similar to step 703 (FIG. 7).

Preferably, at step 806, microprocessor 3 deletes the software code which has been recorded in memory 32 at step 802.

According to an embodiment where, on ciphering of the software code of the new update to obtain data 302-3, no integrity code 3032 has been generated, on deciphering of data 302-3 by microprocessor 3, no other integrity code is generated. In this embodiment, after step 802, step 403 then directly carries on to step 808.

At step 808, microprocessor 3 modifies the table of indirection between the update indexes and the updates pointed to by at least some of the indexes. More particularly, microprocessor 3 points to the update index equal to target index 3020, to the new update, that is, to the address of memory 32 having the software code of the new update recorded therein at step 802. If, before the modification of the indirection table, the update index was pointing to no update, this amounts to adding an update to the concerned service. If, before the modification of the indirection table, the update index was pointing to an update, this amounts to replacing this update with the new update.

Step 808, and more generally the method of modifying memory 32, ends as described in relation with step 403 of FIG. 4.

In an alternative embodiment not illustrated of the method of FIG. 8, after step 501, if parameter 3022 is at value IS or IP, step 403 carries on to step 700 of FIG. 7.

In this variation, not illustrated, if an integrity code 3032 has been generated on ciphering of data 302-3, step 700 comprises, on deciphering of data 302-3, generating another integrity code, and the step carries on to step 701 of FIG. 7. If, at step 701, the integrity codes are identical, step 701 carries on with a new step of testing the value of parameter 3022. If parameter 3022 is at value IP, this new test step is followed by step 808 of FIG. 8, and if the parameter is at value IS, the new test step is followed by step 702 of FIG. 7.

In this variation, not illustrated, if no integrity code has been generated on ciphering of data 302-3, step 700 directly carries on to the new step of testing the value of parameter 3022, and the method then carries on as described in the previous paragraph.

A method where parameter 3022 may take any value among values RS, RP, IS, IP, and IR has been described in relation with FIG. 8. It will be within the abilities of those skilled in the art to adapt this method to the case where parameter 3022 may take any value among only some of values RS, RP, IS, IP, and IR, for example, among values RS, RP, IP, and IR only.

Further, the inventors optionally provide an embodiment of a method of managing a storage space reserved in memory 32, so that software code is recorded therein on each implementation of step 702 or of step 808. The reserved space then corresponds to a range of successive memory addresses of memory 32. The reserved space may also be modified on implementation of step 800 and of step 502 if the latter corresponds to the suppressing of a service having its software code recorded into the reserved storage space.

Figure 9:
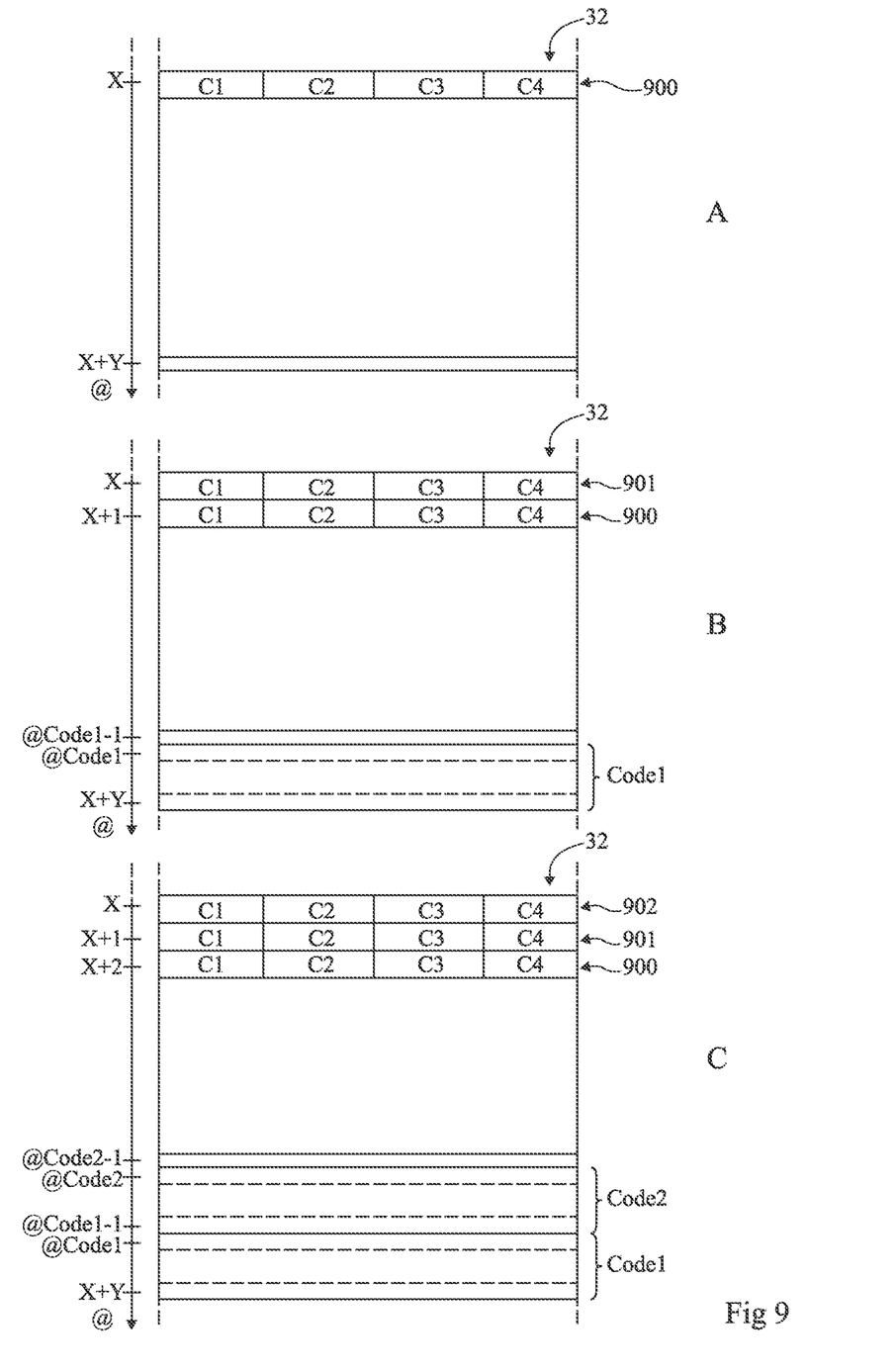
FIG. 9 shows three simplified views A, B, and C illustrating an embodiment of a method of managing a storage space in a memory of a microprocessor of the system of FIG. 1, during implementations of the method of FIG. 5, 7, or 8.

This method will now be described in relation with FIG. 9. FIG. 9 comprises three views A, B, and C illustrating the reserved storage space respectively in an initial state, after the implementation of a step 808, and after the implementation, further, of a step 702. It is here considered that the range of successive addresses of memory 32 corresponding to the reserved storage space starts at address X and ends at address X+Y, each address corresponding to a memory word of memory 32. In other words, the reserved storage space comprises a number Y+1 of memory words, each identified by an address.

In this method, as illustrated in view A of FIG. 9, initially, the reserved storage space contains no software code. Further, the reserved storage space comprises a memory word 900 comprising four fields C1, C2, C3, and C4 respectively representative of a type of modification of memory 32, of a service or update index concerned by the modification, of a size of a software code corresponds to the service or the update pointed to by the concerned index, and of a memory address of the reserved storage space having the software code stored therein. More particularly, in memory word 900, field C1 is at a default value indicating an invalid type of modification of memory 32, field C2 is at a default value indicating an invalid index, field C3 is at a default value, for example, a value indicating a zero software code size, and field C4 is at a default value indicating the address, starting from the end of the reserved space, of the first free memory word in the reserved storage space, that is, here, address X+Y.

In the initial state, memory word 900 is at beginning address X of the reserved storage space.

In view B of FIG. 9, software code Code1, corresponding in this example to an update, has been recorded into the reserved storage space illustrated in view A, on implementation of a step 808.

For this purpose, code Code1 has been recorded in the reserved storage space so that the range of successive addresses of code Code1 extends from the address indicated in field C4 of word 900 of view A, that is, here, address X+Y.

Further, field C4 of word 900 has been set to a value indicating the address, starting from the end of the reserved space, of the first free memory word of the reserved storage space, in this example address @Code1-1.

Word 900 has then been shifted by one address, towards the end of the reserved storage space, here, address X+1.

A word 901 comprising four fields C1, C2, C3, and C4 has then been recorded at the beginning address of the reserved storage space, here at address X. Field C1 of word 901 is at a value indicating that the type of memory modification concerns the addition of a software code of an update. Field C2 of word 901 is at a value indicating the update index pointing to code Code1. Field C3 is at a value indicating the size of code Code1. Field C4 is at a value indicating the beginning address of the address range of code Code1, in this example address @Code1.

In view C of FIG. 9, software code Code2, corresponding to a new service, has been recorded into the reserved storage space illustrated by view B, as a result of the implementation of a step 702.

For this purpose, code Code2 has been recorded into the reserved storage space so that the range of successive addresses of code Code2 extends from the address indicated in field C4 of word 900 of view B, in this example address @Code1-1. More particularly, the range of successive addresses of code Code2 ends at address @Code1-1.

Further, field C4 of word 900 has been set to a value indicating the address, starting from the end of the reserved space, of the first free memory word of the reserved storage space, that is, here, address @Code2-1.

Words 900 and 901, that is, the words each comprising fields C1, C2, C3, and C4, have then been shifted by one address towards the end of the reserved storage space. Thus, in this example, word 900 is shifted to address X+2, and word 901 is shifted to address X+1.

A word 902 comprising the four fields C1, C2, C3, and C4 has then been recorded at the beginning address of the reserved storage space, here address X. Field C1 of word 902 is at a value indicating that the type of memory modification concerns the addition of a software code of a new service. Field C2 of word 902 is at a value indicating the service index pointing to code Code2. Field C3 of word 902 is at a value indicating the size of code Code2. Field C4 of word 902 is at a value indicating the beginning address of the address range of code Code2, in this example address @Code2.

More generally, each addition of a software code into the reserved storage space comprises: shifting, by one address towards the end of the reserved storage space, the memory words representative of the software codes recorded in the reserved storage space, and the initial memory word 900 representative of the address, starting from the end of the reserved storage space, of the first free memory word or, in other words, shifting the words comprising fields C1 to C4; recording, in a range of successive addresses, the last one of which corresponds to the address indicated by field C4 of initial word 900, the software code to be added; recording, at the beginning address of the reserved storage space, a memory word representative of the new software code or, in other words, a memory word comprising fields C1 to C4; and updating initial memory word 900 so that the address indicated by its field C4 corresponds to the address, starting from the end of the reserved storage space, of the first free memory word.

Further, although this is not illustrated, preferably, the method described in relation with FIG. 9 further comprises, when a software code is suppressed from the reserved storage space, the steps of:

suppressing the software code; shifting towards the end of the reserved storage space, by a number of addresses corresponding to the size of the suppressed software code, the possible software codes recorded before the suppressed software code in the reserved storage space, that is, on the side of the beginning of the reserved storage space with respect to the suppressed software code; suppressing the memory word representative of the suppressed software code; and updating the memory words representative of the software codes recorded in the reserved storage space, and in particular their fields C4; and shifting by one address towards the beginning of the reserved memory space the memory words representative of the software codes recorded in the reserved storage space.

The above-described method enables to keep a continuous free storage space to record therein new software codes, which is as large as possible given the size of the reserved storage space and the software codes which are already recorded therein.

In the above description, it has been considered that addresses X and X+Y respectively are the beginning and end addresses of the reserved storage space. However, this is a convention only and it is within the abilities of those skilled in the art to adapt the above-described method to the case where it is considered that, by convention, addresses X and X+Y respectively are the end and beginning addresses of the reserved storage space.

Although this is not detailed herein, it is within the abilities of those skilled in the art to adapt the method described in relation with FIG. 9 to the case where parameter 3022 (FIGS. 3 and 6) can only take some of values IR, RS, RP, IP, and IS.

Various embodiments and variations have been described. Those skilled in the art will understand that certain features of these various embodiments and variations may be combined, and other variations will occur to those skilled in the art. In particular, the case of a ROM-type memory 33 has been described hereabove, that is, a read-only memory having its content set on manufacturing of the memory. In alternative embodiments, memory 33 corresponds to a memory, for example, of flash type, having a content which is not set on manufacturing, but rather by definitively forbidding any write access to memory 33 once it has been programmed, for example, by destroying a fuse of configuration of memory 33.

Embodiments and variations of modifications of a set of services exposed by a microprocessor 3 by modifying a memory 32 of microprocessor 3 have been described hereabove, where the set of services initially exposed by microprocessor 3, on powering-on thereof, is determined by the set content of another memory 33 of the microprocessor, and the initial content of memory 32 is also determined by the set content of memory 33. Such embodiments and variations are not limited to the case where microprocessor 3 is a secure microprocessor (hardware security module).

Finally, the practical implementation of the described embodiments and variations is within the abilities of those skilled in the art based on the functional indications given hereabove. In particular, concerning the programming of data 300 in microprocessor 2 by an authorized person, it is within the abilities of those skilled in the art to generate data 300, to record them into a non-volatile memory of microprocessor 2, and to program microprocessor 2 so that the latter records data 300 into a given memory location and generates a request of modification of the content of memory 32 of microprocessor 3, the request indicating, in particular, in which memory location data 300 are accessible by microprocessor 3.

What is claimed is:

1. A method comprising:
receiving, by a first microprocessor, a request of modification of a content of a first memory of the first microprocessor, the first memory being accessible only by the first microprocessor;
accessing, by the first microprocessor, first data associated with the request and a signature generated from the first data with an asymmetric cipher algorithm, the first data and the signature being available in a second memory of a second microprocessor, and the first data being representative of a modification to be applied to the content of the first memory, the modification being representative of a modification of a set of services exposed by the first microprocessor;
verifying, by the first microprocessor, authenticity of the first data based on the signature; and
modifying the content of the first memory according to the first data, the modifying being conditioned by the verifying.

2. The method of claim 1, wherein:
a first indirection table is stored in the first memory, the first table comprising one or more first indexes, each of which points to a different exposed service or to a non-supported service;
the first data comprise second data representative of at least a target index and a parameter having a value selected from among at least a first value and a second value; and wherein modifying the content of the first memory comprises:
when the parameter is at the first value, modifying the first table to have an index from the first indexes, equal to the target index, that points to a non-supported service, or when the parameter is at the second value, modifying the first table to have an index from the first indexes, equal to the target index, that points to another service not yet exposed.

3. The method of claim 1, wherein:
a first indirection table is stored in the first memory, the first table comprising one or more first indexes, each of which points to a different exposed service or to a non-supported service;
the first data comprise second data representative of at least a target index and a parameter having a value selected from among at least a first value and a second value; and wherein modifying the content of the first memory comprises:
when the parameter is at the first value, modifying the first table to have an index from the first indexes, equal to the target index, that points to a non-supported service, and
when the parameter is at the second value, modifying the first table to have an index from the first indexes, equal to the target index, that points to another service not yet exposed.

4. The method of claim 3, wherein the value of the parameter is selected from among at least the first value, the second value, and a third value, and wherein modifying the content of the first memory comprises:
when the parameter is at the third value, recording a software code of a new service into the first memory, and modifying the first table to have an index from the first indexes, equal to the target index, that points to the new service.

5. The method of claim 4, wherein:
a second indirection table is stored in the first memory, the second table comprising one or more second indexes, each of which points to an area of the first memory containing or not an update of one of the exposed services; and
the value of the parameter is selected from among at least the first value, the second value, and a fourth value, and wherein modifying the content of the first memory comprises: when the parameter is at the fourth value, suppressing the update contained by the area of the first memory pointed to by a second index from the second indexes that equals to the target index.

6. The method of claim 5, wherein the value of the parameter is selected from among at least the first value, the second value, the fourth value, and a fifth value, and wherein modifying the content of the first memory comprises: when the parameter is at the fifth value, recording, in the area of the first memory pointed to by the second index equal to the target index, a software code of an update of one of the exposed services.

7. The method of claim 6, wherein the first data comprise third data representative of the software code recorded when modifying the content of the first memory.

8. The method of claim 7, wherein the second data are data ciphered by a symmetric cipher algorithm, and wherein modifying the content of the first memory comprises deciphering of the second data by the first microprocessor.

9. The method of claim 8, wherein the third data are data ciphered by another symmetric cipher algorithm, and wherein modifying the content of the first memory comprises: after the deciphering of the second data, deciphering of the third data by the first microprocessor.

10. The method of claim 9, wherein the second data are further representative of a first integrity code generated on ciphering of the third data, wherein deciphering of the third data further comprises comparing the first integrity code with a second integrity code generated on deciphering of the third data, the modification of the content of the first memory according to the first data being conditioned by the comparison.

11. A method comprising:
receiving, by a first microprocessor, a request of modification of a content of a first memory of the first microprocessor, the first memory being accessible only by the first microprocessor;
accessing, by the first microprocessor, first data associated with the request and a signature generated from the first data with an asymmetric cipher algorithm, the first data and the signature being available in a second memory of a second microprocessor, and the first data being representative of a modification to be applied to the content of the first memory, the modification being representative of a modification of a set of services exposed by the first microprocessor;
verifying, by the first microprocessor, authenticity of the first data based on the signature; and
modifying the content of the first memory according to the first data, the modifying being conditioned by the verifying, wherein:
a first indirection table is stored in the first memory, the first table comprising one or more first indexes, each of which points to a different exposed service or to a non-supported service:
the first data comprise second data representative of at least a target index and a parameter having a value selected from among at least a first value and a second value; and wherein modifying the content of the first memory comprises:
when the parameter is at the first value, modifying the first table to have an index from the first indexes, equal to the target index, that points to a non-supported service, and when the parameter is at the second value, modifying the first table to have an index from the first indexes, equal to the target index, that points to another service not yet exposed, wherein the set of services initially exposed by the first microprocessor is determined by the content of a third non-volatile memory of the first microprocessor, the content of the third memory being set and accessible by the first microprocessor only.

12. The method of claim 11, wherein the third non-volatile memory is a read only memory.

13. The method of claim 11, wherein the another service not yet exposed is determined by the content of the third memory.

14. The method of claim 11, wherein the update data further comprise fourth non-ciphered data indicating:
the asymmetric cipher algorithm used;
a vector of initialization of the symmetric ciphering;
a size of the first data; and
a version of the third memory and of its content.

15. The method of claim 11, wherein the update data further comprise fourth non-ciphered data indicating
the asymmetric cipher algorithm used;
a vector of initialization of the symmetric ciphering;
a size of the first data; or
a version of the third memory and of its content.

16. The method of claim 1, wherein the first memory is a volatile memory.

17. A first microprocessor comprising:
a processor and a non-volatile memory having a set content, the non-volatile memory comprising a program with instructions which, when they are read by the processor, cause the processor to
receive a request of modification of a content of a first memory of the first microprocessor, the first memory being accessible only by the first microprocessor,
access first data associated with the request and a signature generated from the first data with an asymmetric cipher algorithm, the first data and the signature being available in a second memory of a second microprocessor, and the first data being representative of a modification to be applied to the content of the first memory, the modification being representative of a modification of a set of services exposed by the first microprocessor,
verify, by the first microprocessor, authenticity of the first data based on the signature, and
modify the content of the first memory according to the first data, the modifying being conditioned by the verifying.

18. The first microprocessor of claim 17, wherein a first indirection table is stored in the first memory, the first table comprising one or more first indexes, each of which points to a different exposed service or to a non-supported service;
the first data comprise second data representative of at least a target index and a parameter having a value selected from among at least a first value and a second value; and
wherein the instructions to modify the content of the first memory comprise:
when the parameter is at the first value, modify the first table to have an index from the first indexes, equal to the target index, that points to a non-supported service, and
when the parameter is at the second value, modify the first table to have an index from the first indexes, equal to the target index, that points to another service not yet exposed.

19. The first microprocessor of claim 18, wherein the value of the parameter is selected from among at least the first value, the second value, and a third value, and wherein the instructions to modify the content of the first memory comprise:
when the parameter is at the third value, record a software code of a new service into the first memory, and modify the first table to have an index from the first indexes, equal to the target index, that points to the new service.

20. The first microprocessor of claim 19, wherein:
a second indirection table is stored in the first memory, the second table comprising one or more second indexes, each of which points to an area of the first memory containing or not an update of one of the exposed services; and
the value of the parameter is selected from among at least the first value, the second value, and a fourth value, and wherein the instructions to modify the content of the first memory comprise: when the parameter is at the fourth value, suppress the update contained by the area of the first memory pointed to by a second index from the second indexes that equals to the target index.

* * * * *